United States Patent [19]

Lutter

[11] 4,015,324
[45] Apr. 5, 1977

[54] DEVICE FOR SEPARATING FLANGE PIPES

[76] Inventor: Arnold Lutter, Bruckenkopf 10 1/2, Ingolstadt, Germany, 8070

[22] Filed: May 21, 1976

[21] Appl. No.: 688,730

[30] Foreign Application Priority Data

May 23, 1975 Germany .......................... 2522817

[52] U.S. Cl. ................................. 29/239; 254/100
[51] Int. Cl.² ........................................ B23P 19/04
[58] Field of Search .................... 29/239, 263, 256; 254/100

[56] References Cited

UNITED STATES PATENTS

| 1,804,935 | 5/1931 | Jacobus | 29/239 |
| 2,159,593 | 5/1939 | Klermund | 29/239 |
| 3,107,419 | 10/1963 | Sandifer | 29/239 |
| 3,426,752 | 2/1969 | Laico | 29/239 |

Primary Examiner—James L. Jones, Jr.
Attorney, Agent, or Firm—Karl F. Ross; Herbert Dubno

[57] ABSTRACT

Pipe flanges of a flanged-pipe joint are separated for replacement of seals or any other purpose by fitting an expandable plug into a bore of one of the flanges, inserting a plate in the gap between the flanges and threading a screw into the expandable plug to cause the latter to grip the wall of the bore while the screw bears against the plate to push the flanges apart. The expandable plug preferably comprises an internal wedging core which displaces outwardly the segments from which the outer member of the plug is formed, the segment being externally toothed to grip the wall.

10 Claims, 4 Drawing Figures 4,015,324

DEVICE FOR SEPARATING FLANGE PIPES

Field of the Invention

The present invention relates to a device for separating pipes and, more particularly, to a device for spreading apart a pair of perforated flanges of a flange-pipe joint.

BACKGROUND OF THE INVENTION

Flanged-pipe joints are desirable for a large number of industrial purposes and generally are formed between a pair of aligned pipes each of which is provided with a circular flange formed with a multiplicity of perforations or bores adapted to be traversed by respective bolts which draw the flanges together. A seal may be provided inwardly of the array of bores and the flanges outwardly of the seals are usually spaced apart to define a gap ensuring that the flanged ends of the pipes will bear tightly against the seals. In other words the confronting annular surfaces of the flanges are set back from the ends of the pipes which are to form the actual seal.

For replacement of such pipes, e.g. to change the seals or for reassembly or disassembly of a portion of an apparatus, it is necessary to separate the flanges at the joint. It may be desirable to insert disks, new sections of pipe in an existing line, or new pieces of apparatus provided with flanged fitting, to replace a burst pipe, to resurface a corroded sealing face or to replace a seal clamped in the pipe joint.

Such disconnection of a flanged-joint is not always simple since the pipes are generally held together with a high longitudinal force which may be generated by mounting of the lengths of pipe or flanged fittings tightly in place, because the assembly has been anchored in a mounting structure or simply to resist the forces which tend to break open the joint. Furthermore, corrosion may cause the flanged-joint to be locked against separation. The forces holding the joint together, in spite of removal of the bolts, are particularly pronounced when the pipes connect the flanged fittings of fixedly positioned vessels.

In order to separate the sections of pipe the flanged-joint it is known to drive a wedge into the gap between the flanges, the wedge generally being constituted of wood to prevent excessive damage to the flanges and their surfaces. However, in spite of considerable care, damage to the sealing surfaces frequently occurs. The damaged sealing surfaces cannot be reused and refirnishing of them is very expensive and can involve long downtime when the pipeline is part of an industrial establishment. The use of wedges which must be driven between the flanges of the joint also has the disadvantage that the technique may be dangerous to personnel in the vicinity since the wedge tends to fly out of the gap as it is being driven.

U.S. Pat. No. 2,358,651 describes a system for separating the flanges of a joint or changing the seals thereof which involves threading a screw into respective internally threaded bores of one of the flanges. Simply by screwing in the pressure bolts it is possible to urge the flanges apart so that the seal, which is received in a groove, can be replaced.

The disadvantage of this system is that separate bores within internal threads must be provided in the flanges so that the system cannot be used with conventional flanges and involves additional costs in the fabrication of such pipe flanges to accommodate the technique.

Another system is described in U.S. Pat. No. 3,393,795 in which a friction fitting is provided on the outer side of the flange and cooperates with a screw spindle also disposed laterally of the flanges. Because the system invariably tilts, the device has been found to be only limitedly successful.

U.S. Pat. No. 3,107,419 describes a hydraulic device in which a pair of grippers engage the flanges to be separated. This device has been found to be difficult to handle and to cause problems in use. Similar disadvantages also characterize rotary wedges between the flanges and lateral spindles driven into the gap between them.

OBJECTS OF THE INVENTION

It is the principal object of the present invention to provide an improved device for separating the flanges of a flange-pipe joint whereby the disadvantages of the earlier system are avoided and the separation is accomplished without special construction of the flanges and without damage thereto.

Another object of the invention is to provide a simplified flanged-joint separator which can be used on conventional pipe flanges, is easy to handle, is of low cost and does not damage the pipe joints.

SUMMARY OF THE INVENTION

These objects are attained, according to the present invention, in a device in which a plug is fitted into an unthreaded bore of one of the flanges of the joint and is provided with an expandable outer member and a wedging core member whose displacement relative to the outer member forces the latter outwardly to seize the inner wall of the bore. A spindle is threaded into the core member and bears against the opposing flange to drive the flanges apart as the spindle is threaded into its core member.

According to the principles of the invention, therefore, the device is a simple tool which does not expose the user to danger and can generate considerable force to separate the flanges without special modification thereof. The device is small and easily manipulated so that its transportation does not involve any significant expenses. Furthermore, it allows separation of flanges which are disposed in a confined area with only a limited availability of longitudinal play for surrounding space.

According the invention, the outer member of the plug assembly comprises a sleeve subdivided into a plurality of segments which are biased by spring means inwardly so that, in the innermost portions of the segments, the sleeve has a diameter which is less than the diameter of the bore in which the plug is to be inserted. The internal surface of the sleeve may be generally tapered, e.g. conical, and cooperates with an externally tapered core member formed with an internal thread into which the spindle or bolt is threaded. The segments can be spread outwardly as the bolt is tightened in the core member to seize the inner wall of the bore with teeth formed on the exterior of the sleeve. The sleeve can therefore be described as an expandable sleeve.

An advantage of the device of the present invention can be found in the fact that it is possible, without wedges or other dangerous or difficult-to-manipulate devices, it is possible to separate the flanges without damaging the sealing surfaces. The device is capable of generating exceptionally large separating forces which are limited only by the ability of the walls of the bore to withstand the lateral or radial pressures placed thereon. Another advantage is that one and the same device can be provided at multiple locations around the pipe joint when a plurality of spreading elements are required and that the device can be used for different flange sizes and types.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 3:
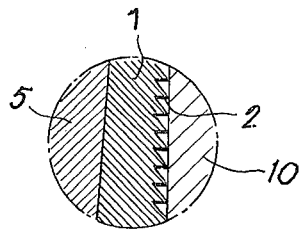
FIG. 3 is a detail of the region III of FIG. 1 drawn to an enlarged scale and in axial section.
Figure 1:
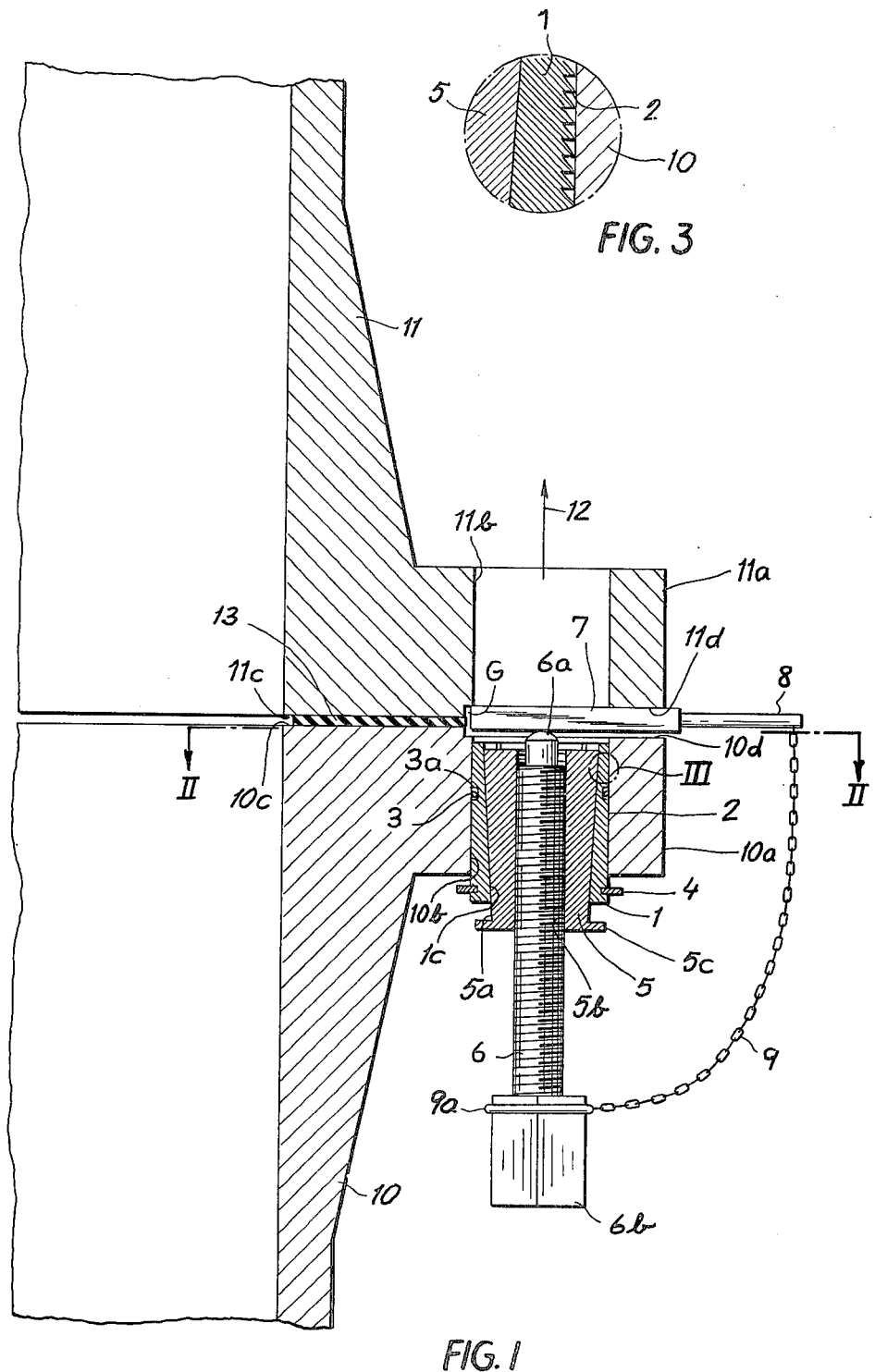
FIG. 1 is a fragmentary axial section through a pipe joint showing the device of the present invention in place.
Figure 2:
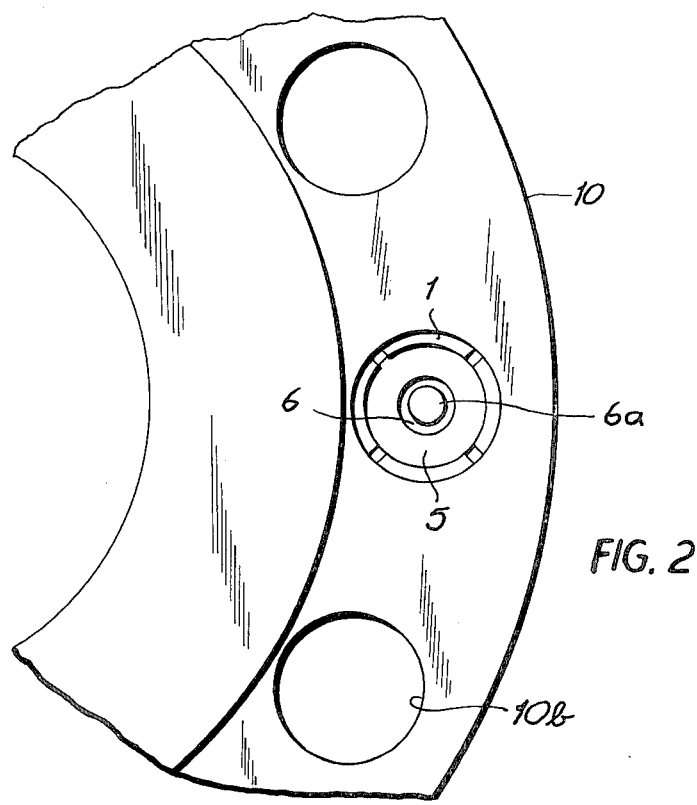
FIG. 2 is a section taken along line II - II of FIG. 1.

A divided sleeve 1, which is formed from four segments 1a, 1b etc., (FIG. 4), is provided at one end with a saw-toothed profile 2 and is held together resiliently by a split ring 3 received in a groove 3a in the segments. A further split ring 4 is provided at the opposite end of the sleeve as well. The interior of the sleeve 1 is formed with a frustoconical cavity 1c which converges away from the joint which is formed between a pair of pipes 10 and 11 with respective flanges 10a and 11a provided with aligned bores 10b, 11b through which the joint-tightening bolts are passed in accordance with conventional practices.

The confronting surfaces 10c and 11c of the pipes, inwardly of the array of bores 10b, 11b receiving sealing annulus 13 between them and clamp against this annulus when the bolts are tightened. The flanges 10a and 11a have their confronting surfaces 10d and 11d set back from the faces 10c and 11c to define a gap G between them.

A bolt 6 is threaded into the internally threaded core member 5 of the device, the core member having an outer surface 5a which frustoconically converges in the direction in which the cavity 1c of the sleeve 1 converges. The tip 6a of the bolt 6 is rounded and bears against a plate 7 which can be inserted into the gap G and thus has a thickness less than the width of this gap. As the bolt is threaded into the bore 5b of the core member 5, to bear against the plate 7, it applies an axial thrust in the direction of arrow 12 to press this plate against the surface 11d. The reaction force urges the core member 5 in the opposite direction to drive (by wedging action) the segments 1a, 1b, etc., of sleeve 1 outwardly and cause the teeth 2 (roughened portion of the sleeve 1) to engage the inner wall of the bore 10b, thereby increasing the grip of the sleeve 1 against the wall as the axial force in the direction of arrow 12 increases.

With increasing axial force, the flange of pipe 11 is moved away from the flange of pipe 10. The screw 6 can be turned until sufficient free space is available between the pipes to enable replacement of the seal 13.

Figure 4:
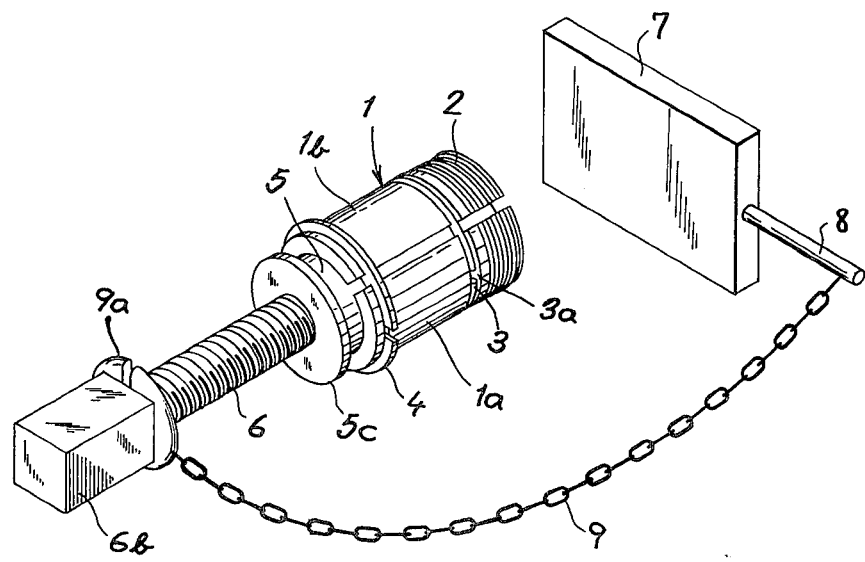
FIG. 4 is a perspective view of the device of the invention.

The plate 7 is formed with a handle 8 for ease of manipulation of the plate, the handle being connected by a flexible member, e.g. a chain 9 to a ring 9a which is freely rotatable on the prismatic head 6b of the screw 6. The head can thus be engaged by an appropriate wrench. The chain 9 ensures retention of the abutment plate 7 which the screw 6 and its sleeve assembly to form a readily handled transporation unit. Similarly, the core 5 can be coupled with the sleeve 1 to prevent separation thereof. If the force required to separate the joint cannot be achieved with one such unit as illustrated in FIG. 4 several units may be symmetrically disposed in other bores of the flange 10a around the pipe 10, the screws thereof being turned successively. Preferably such devices are disposed diagonally or diametrically opposite one another in pairs.

When the device is to be removed, the screw 6 is rotated in the opposite sense until it no longer bears upon the plate 7 so that the latter can be laterally withdrawn. The bolt 6 can be driven inwardly (arrow 12) by the impact of a hammer on its head 6b to shift the core 5 inwardly and release the sleeve 1, which is drawn inwardly by rings 3 and 4, from the wall of the bore 10b. The assembly thereupon contracts to a diameter less than that of the bore and can be readily withdrawn. A head or flange 5c on the core member 5 can facilitate gripping thereof by the hand of the user and hence withdrawal in assembly.

I claim:

1. A device for separating the flanges of a pipe joint wherein a pair of flanges are spacedly juxtaposed and at least one of the flanges is provided with a bore, said device comprising a spreadable sleeve receivable in said bore, an internally threaded core member received in said sleeve and axially displaceable relative thereto for spreading said sleeve against the wall of said bore to anchor said sleeve in said bore, a plate receivable between said flanges, and a screw threaded into said core member and adapted to bear against said plate for pressing said plate against the other of said flanges while simultaneously displacing said sleeve and said core relatively, thereby spreading said flanges apart.

2. The device defined in claim 1 wherein said sleeve is formed along its exterior with roughening formations engageable with said wall of said bore.

3. The device defined in claim 1 wherein said sleeve and said core member are formed with complementary wedging surfaces spreading said sleeve against said wall of said bore upon relative axial displacement of said core member and said sleeve.

4. The device defined in claim 3, further comprising means movably coupling said screw to said plate.

5. The device defined in claim 4 wherein said sleeve is formed with teeth of sawtooth profile along its exterior engageable with said wall of said bore.

6. The device defined in claim 5 wherein said sleeve is formed from a plurality of segments, and soring means beasing said segments inwardly.

7. The device defined in claim 6 wherein said bolt has a rounded tip adapted to bear against said plate and a prismatic head, said means movably connecting said plate to said screw including a ring rotatable on said screw and a flexible element connecting said ring to said plate, said plate having a handle connected to said flexible element.

8. The device defined in claim 7 wherein said core member has a frustoconical outer surface bearing upon said segments, said sleeve having an internal frustoconical surface resting against said frustoconical surface of said core member, said core member projecting axially from said sleeve at one end thereof and being formed at said one end with a circumferential flange.

9. The device defined in claim 9 wherein said spring means includes an externally open groove formed in said sleeve and a spring ring received in said groove.

10. The device defined in claim 9 wherein four such segments are provided on said sleeve.

* * * * *